April 26, 1927.  A. McNISH  1,626,548

MACHINE FOR MAKING BOTTLES OR OTHER ARTICLES OF GLASS

Filed April 15, 1926  6 Sheets-Sheet 1

A. McNish
inventor

By: Marks & Clark
Attys

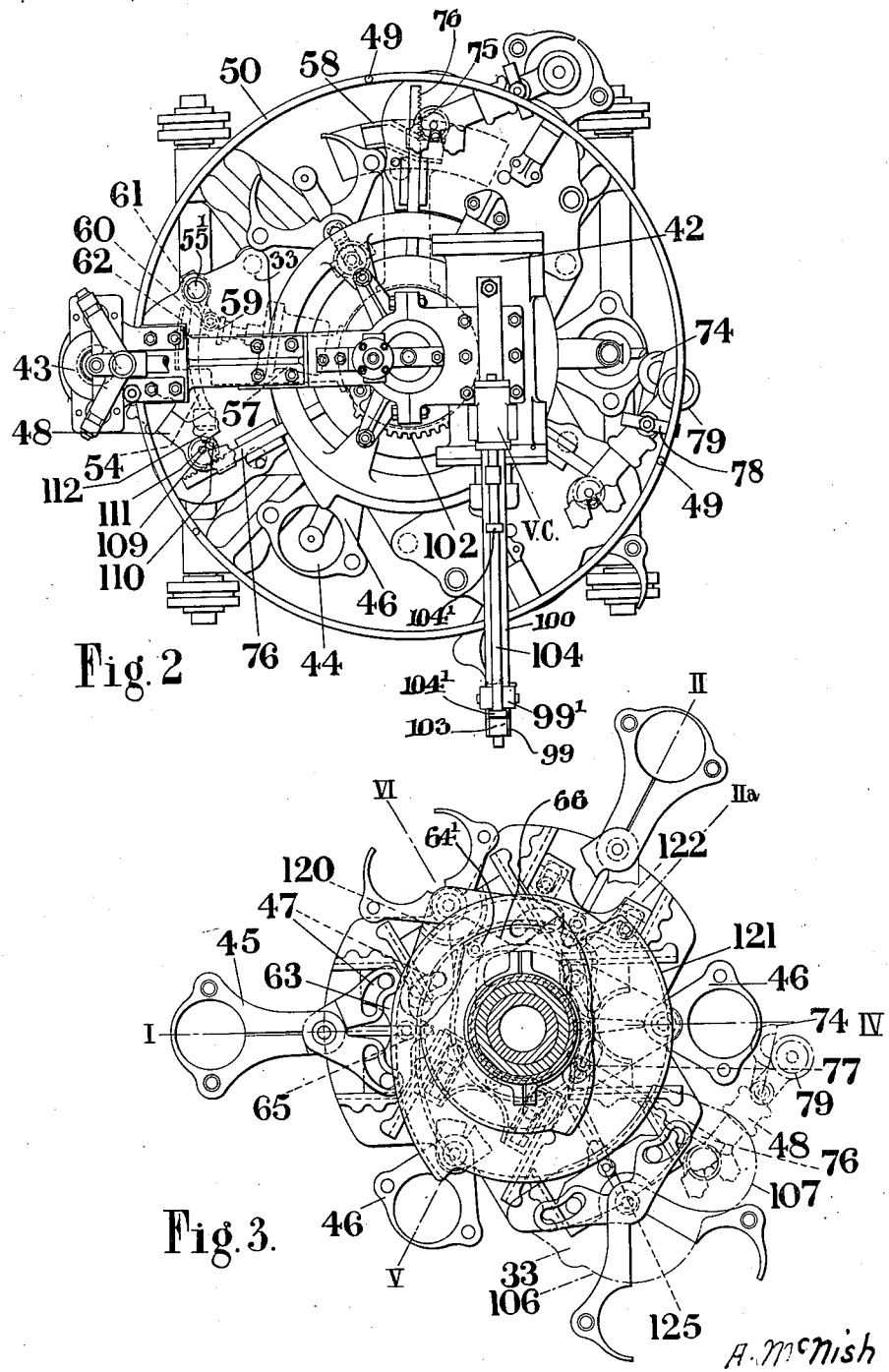

April 26, 1927.

A. McNISH 1,626,548

MACHINE FOR MAKING BOTTLES OR OTHER ARTICLES OF GLASS

Filed April 15, 1926    6 Sheets-Sheet 3

A. McNish
Inventor

By: Marks & Clerk
Attys

April 26, 1927. 1,626,548
A. McNISH
MACHINE FOR MAKING BOTTLES OR OTHER ARTICLES OF GLASS
Filed April 15 1926    6 Sheets-Sheet 4
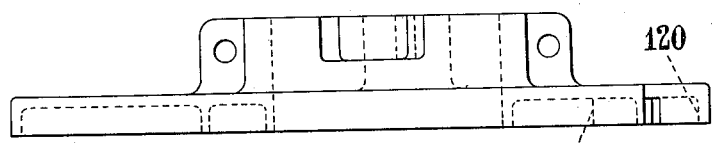
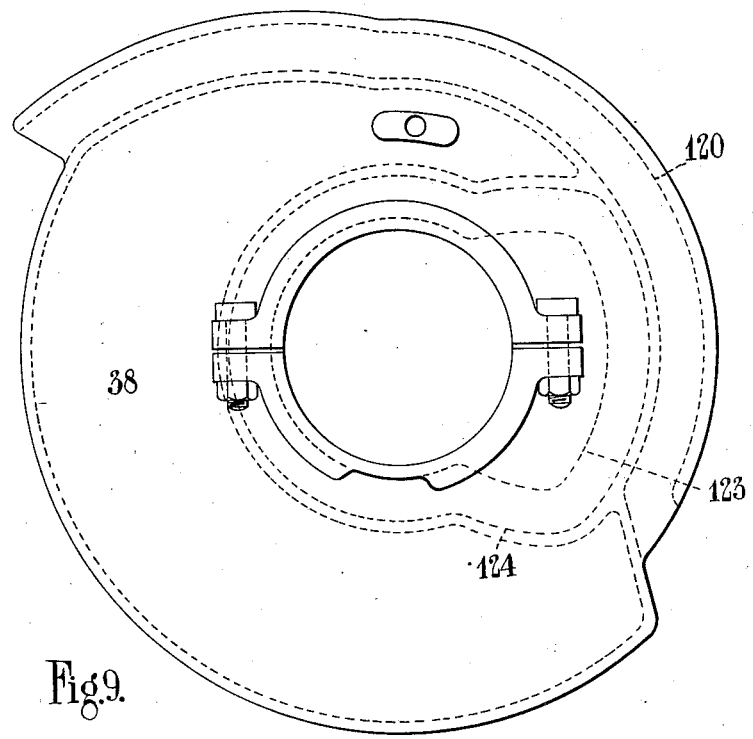
A. McNish
Inventor
By: Marks & Clark
Attys April 26, 1927.  A. McNISH  1,626,548

MACHINE FOR MAKING BOTTLES OR OTHER ARTICLES OF GLASS

Filed April 15 1926    6 Sheets-Sheet 5

A. McNish
Inventor

By: Marks & Clark
Attys

April 26, 1927.　　　　　　A. McNISH　　　　　　1,626,548
MACHINE FOR MAKING BOTTLES OR OTHER ARTICLES OF GLASS
Filed April 15, 1926　　　6 Sheets-Sheet 6

A. McNish
INVENTOR
By: Marks & Clark
Attys.

Patented Apr. 26, 1927.

1,626,548

UNITED STATES PATENT OFFICE.

ALEXANDER McNISH, OF LONDON, ENGLAND, ASSIGNOR OF ONE-HALF TO THE AUTOMATIC BOTTLE MACHINE CORPORATION, LIMITED, OF LONDON, ENGLAND.

MACHINE FOR MAKING BOTTLES OR OTHER ARTICLES OF GLASS.

Application filed April 15, 1926, Serial No. 102,261, and in Great Britain April 6, 1925.

This invention relates to automatic machines for making bottles or other articles of glass of the type wherein a mould table is rotated from station to station and a gather of glass is preliminarily moulded in a parison mould, transferred to a finishing mould, blown and ejected from the apparatus.

More particularly the invention relates to the type of machine wherein the rotary table carrying the parison and finishing moulds is adapted to be displaced on a vertical axis in order to take a gather of glass by suction.

The object of the invention is to provide an improved machine of the type described which is adapted to take a gather of glass from an open stream or source of supply such as described in British patent application No. 22,679 of 1924.

The invention comprises a machine for making bottles or other articles of glass of the type set forth wherein a rotary table is provided and supports a parison mould and a finishing or blow mould or a plurality thereof, said table being displaceable on a vertical axis to cause the parison mould to take a gather of glass by suction, and is characterised by the feature that the table is at rest (rotationally) during the gather period.

The gather is preferably sheared after the raising of the table and prior to rotation thereof.

In the accompanying drawings:—

Figure 2 is a plan corresponding thereto;

Figure 3 is a sectional plan on A—A, Figure 1;

Figures 8 and 9 are, respectively, elevation and plan of the parison and finishing mould operating cam, while

Figure 12:
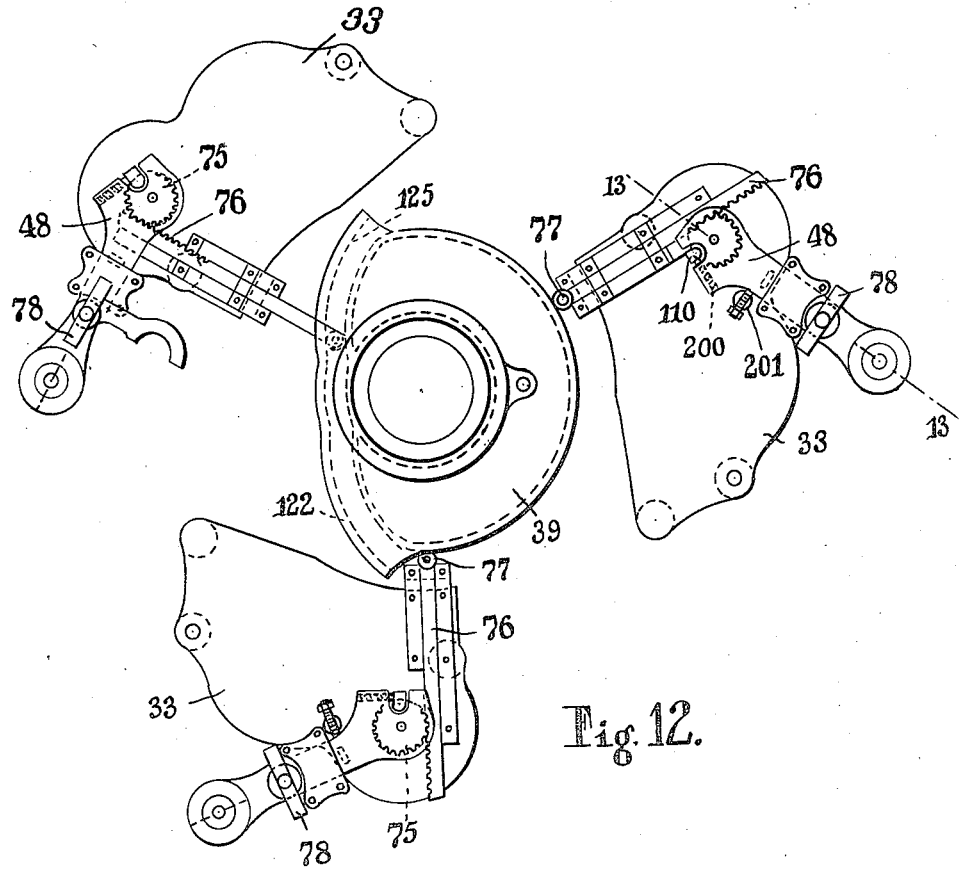
Figure 12 is a plan showing the transfer arms in greater detail.
Figure 13:
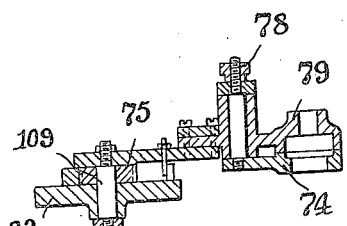

Figure 13 being a section on the line 13—13 of Figure 12.

Figure 14:
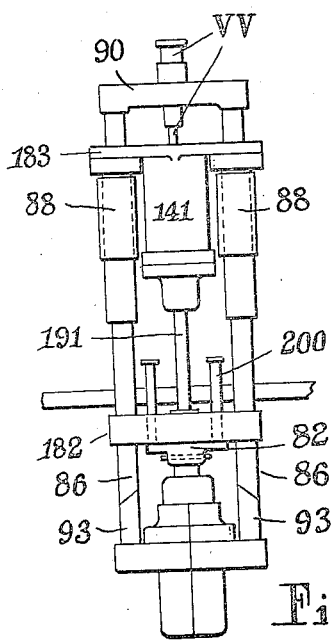
Figure 15:
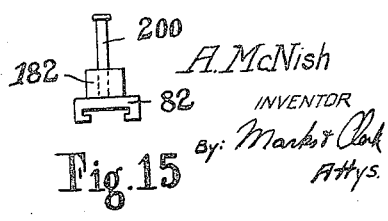

Figure 14 shows an alternative arrangement for supplying vacuum to the parison moulds:

Figure 15 being a detail.

In carrying the invention into effect according to one convenient mode, by way of example, as applied to the production of bottles, a truck or wheeled stand 20 carries a central cylinder support 21 having four legs 22 supported by nuts 23 in engagement with the truck or wheel carriage. A central screw jack device 24 is provided for adjusting the height of the cylinder and the parts carried thereby while the nuts 23 upon the legs are adapted to retain the latter in any adjusted position. Within the cylinder is mounted a piston element 25 carrying a column 26 upon which is rotatably mounted a transverse mould or machine table 27. The upper end of the cylinder carries a crosshead 28 accommodated by slots in the piston column and carrying a rigid inner column member 29 at a fixed height.

The central column 26, in addition to supporting the rotary table 27, also carries a clutch element 30, the counterpart 31 of which is rotatably mounted upon the inner fixed column 29.

The clutch element 30 is supported by brackets 32 from transfer tables 33, three of which are provided and which in turn are supported by the machine table 27 by brackets 34.

The clutch element 31 is rotatably supported upon the inner fixed column 29 by bearing members 35. Driving engagement between the clutch elements is obtained by pins 36 on the member 30 engaging apertures 37 in the element 31.

The central column 26 also has the mould opening and closing cams 38 and transfer cam 39 fixedly mounted upon it.

The fixed column 29 carries at its upper end bracket members 40 supporting a glass plunger cylinder 41 (the plunger of which forms the preliminary depression in the neck of the bottle) and vacuum-applying means for the parison mould. The fixed column also supports a cylinder and piston 42 adapted to provide motive power through the clutch means for rotating the machine table 27.

The parison and finishing moulds 43 and 44, respectively, are carried in pairs of jaws 45 and 46, respectively, pivotally mounted upon the table 27 with tail-pieces or rear wings in which cam slots or grooves 47 are formed and adapted to be engaged by operating pins, the movement of which in a radial direction causes the opening and closing of the moulds at the required times. According to the present example it is preferred to provide three parison and three finishing moulds arranged alternately and having a corresponding number of accessory parts. A pivoted transfer arm 48 is provided in which is mounted a neck ring mould adapted to open and close. The transfer arm is adapted to work between each parison mould and its next following finishing mould during rotation of the table.

The parison moulds may carry pins for closing the ring transfer mould at the appropriate time and the finishing moulds may carry pins for opening the ring transfer mould as the parison is in position to be received by the finishing mould.

According to the preferred arrangement as illustrated, the pins 49 for opening the ring moulds are carried upon a ring member 50 supported from the transfer tables 33 by brackets 51 while a pin 52 for closing the ring mould is mounted by means of a bracket 53 from the cylinder 42.

A shear arm or wiper 54 is provided below the mould table 27 in connection with each parison mould.

The shear arm may be carried by a vertical spindle 55 supported at its upper end by a collar 55' supported in turn by a transfer table 33. The lower end of the spindle may be guided by a bracket 56 depending from the machine table 27.

This shear device is adapted to be operated by a cylinder 57 to remove the surplus glass from the under side of the parison mould and may be returned into its intitial position by contact with a fixed cam 58 upon subsequent rotation of the table.

The shear arm 54 is moved into operative position by contact of the piston rod head 59 with the roller 60 carried by the arm 61 mounted upon the spindle 55. Outward movement of the shear arm may be limited by the roller 60 contacting with the stop 62. The cylinder 57 is controlled by the valve V. S.

It is to be noted that engagement of the head 59 with the roller 60 will only be effected when the table 27 and parts carried thereby are in the elevated position as the cylinder 57 is mounted upon a relatively stationary part.

The parison and ring moulds are adapted to be operated by radial sliding blocks 63, each of which indirectly carries an upwardly projecting roller or pin 64 adapted to engage the appropriate groove formed on the under side of the cam 38. Thus the pins or rollers 64 on the parison mould blocks will engage the outer cam track 65 while the pins or rollers 64' on the finishing or blow mould blocks will engage the inner cam track 66.

Except as regards the shape the sliding blocks are identical in construction for both the parison and finishing moulds.

In order that the active force imparted by the cam during the rotation of the table may act upon the moulds resiliently so that if any obstruction exists the action will not jam, each cam-engaging pin or roller 64 64' is carried by an upper member or hood unit 67 positioned over or upon a lower member or block 68 and connected thereto through springs 69. The rollers or pins 169 for operating in cam grooves 47 of the wings or tail-pieces of the mould-holders are situated upon either side of the cam pins 64 and are carried by the lower members 68. Suitable slots 70 are formed in the hood or upper member through which the tail-piece pins 169 protrude.

The lower member is provided with a keyway 71 adapted to engage a key 71' upon the table while the members are similarly guided with respect to each other by a key and key-way 72. In addition, side guide pieces 73 fixed to the table 27 engage flanges of the upper member, such guide pieces 73 also acting to hold the parts together.

Figure 5:
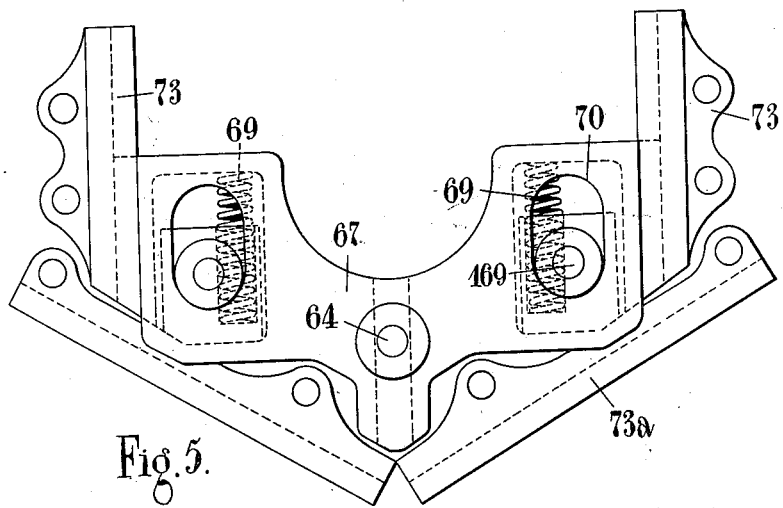
Figure 5 is a plan showing a sliding block for operating a parison mould.
Figure 6:
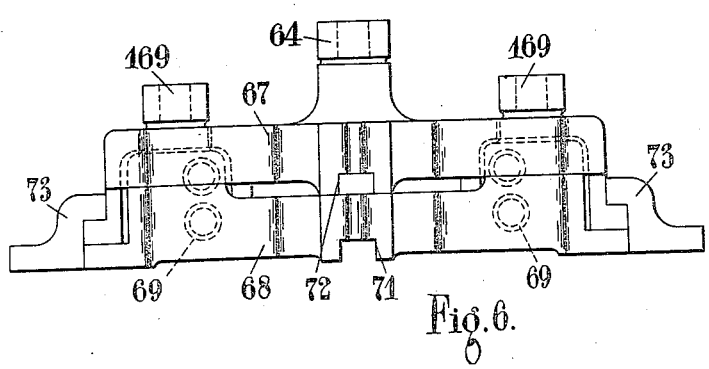
Figures 6 and 7 are elevations corresponding thereto.
Figure 7:
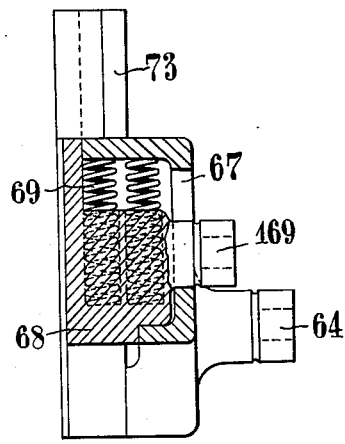
Figure 10:
Figures 10 and 11 are, respectively, elevation and plan of the parison transfer cam.
Figure 4:
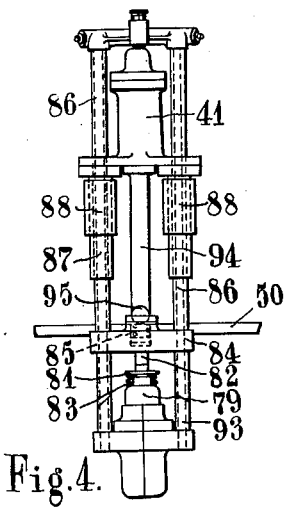
Figure 4 is a partial elevation showing the arrangement for supplying vacuum to the parison mould.
Figure 11:
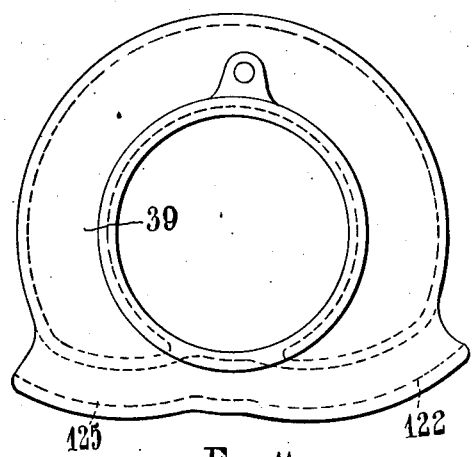

The sliding block shown in Figures 5, 6 and 7 is for a parison mould and the outer guides 73ª are those associated with the adjacent finishing mould blocks.

The clutch member 30 carried by the piston column 26 may be connected by means of a spider framework 32 to supplementary tables or platforms 33 (which in turn are fixedly connected to the rotary table) for supporting the ring mould transfer mechanism and their operative means. These platforms also carry arms or brackets 51 adapted to cause the glass plunger cylinder 41 and the vacuum means to be raised and lowered with the mould table.

The transfer means see Figs. 12 and 13, comprises a divided ring mould preferably formed so that the under half 74 thereof is pivoted to the transfer arm 48 which is itself pivoted upon the secondary table or platform 33. The transfer arm 48 is provided with a gear wheel or segment 75 at its pivot adapted to mesh with a rack arm 76 which is guided upon the secondary table 33 and has a roller or pin 77 adapted to engage with a cam groove formed in the cam gage plate or flange 39 rigidly mounted on the centre column 26 so that as the table rotates the rack is reciprocated and rotates the transfer arm between the parison mould and its adjacent finishing mould.

The pins 52 and 49 are adapted to engage a cross-piece 78 mounted upon the lower movable part 74 of the ring mould.

The upper portion 79 of the ring mould is solid and carries a plunger 80 for forming the preliminary depression in the bottle neck. This plunger 80 has a cap or head 81 which is adapted to be engaged by a second spring plunger 82 when the table rotates a parison mould into the dipping position. The ring mould plunger is held in its uppermost position by aid of a spring 83.

The plunger 82 is mounted in a crosshead 84 and is capable of relative movement thereto by the spring 85. The crosshead is fixed to tubular members 86 which pass through guide members 87 adapted to slide within bosses 88 carried by bracket members 89 secured to the bracket 40 attached to the fixed inner column 29.

At their upper ends the tubes 86 are connected to a vacuum head 90 which is connected to the piston rod 91 of the piston 92 working in the cylinder 41.

By this arrangement, when the piston 92 operates and moves, for example downwardly, the vacuum tubes 86 will move downwardly and connect to the short tubes 93 mounted upon the jaws of the parison mould-holder, whereby vacuum may be applied to the parison mould to effect a gather.

The guide members 87 are connected to the cylinder 41 and the latter is adapted to be reciprocated on a vertical axis by the arm 94 connected to the cylinder and carrying a roller 95 engaging the ring 50.

By this arrangement when the table 27 is raised or lowered the cylinder 41 will be raised or fall by gravity.

The supply of vacuum to the vacuum tubes 86 is controlled by the valve V.V. the spindle 96 of which is adapted to engage the cylinder cover 97 at the end of the downward stroke of the piston 92.

According to a modified form, see Figures 14 and 15, the plunger 82 in the form of a clutch may be carried upon a crosshead 182 so that the latter may have independent vertical movement with respect thereto for a portion of its stroke to allow of lost motion. This crosshead is mounted upon the piston rod 191 of a piston moving in a cylinder 141 mounted in a second cross-head 183 which slides upon a pair of guides or bosses 88 depending from the bracket carried by the fixed column. The piston cylinder slides in these guides in being displaced with the table. The first crosshead 182 (carried by the piston rod) also carries the vacuum pipes or conduits 86 which meet in the vacuum head 90 controlled by the valve V.V. which is adapted to be operated by contact with a surface such as the upper end of the cylinder 141.

Upon the piston in the cylinder moving downwardly the vacuum pipes are carried down into contact with ducts or tubes 93 adapted to receive them upon the parison mould. During the first part of this movement the crosshead 182 moves relatively to the clutch member 82 sliding over the pins 200 which support it until the upper surface of the clutch 82 contacts with the crosshead when the clutch moves downwardly for the remainder of the stroke of the piston against the tension of the spring supporting the glass plunger. The clutch 82 then carries with it the glass plunger and causes it to reside within the neck or ring mould so that the top of the neck of the parison is formed around the end of the plunger.

A blow head 197 for the finishing or blow mould is carried from the clutch part 31 mounted upon the fixed central column and the appropriate mould 44 with its contents is raised against this blow head for the blowing operation.

The piston rod 98 of the cylinder 42 is connected to a crosshead 99 which at its upper end is provided with rollers 99' engaging a guide rod 100. The lower end of the crosshead is connected to the rack 101 which engages the sector 102 on the clutch member 31. The upper end of the crosshead 99 also carries a part 103 embracing an extension 104 of the valve V.C. and adapted to engage adjustable collars 104' on said valve rod whereby at the ends of the stroke of the piston controlling the rotation of the table, the valve will be operated to control the supply of motive fluid to the cylinder for raising and lowering the table 27.

The motive fluid to such cylinder is conducted by way of the pipe 105 extending downwardly through the inner fixed column 29 and screwed into the piston 25.

Figure 1:
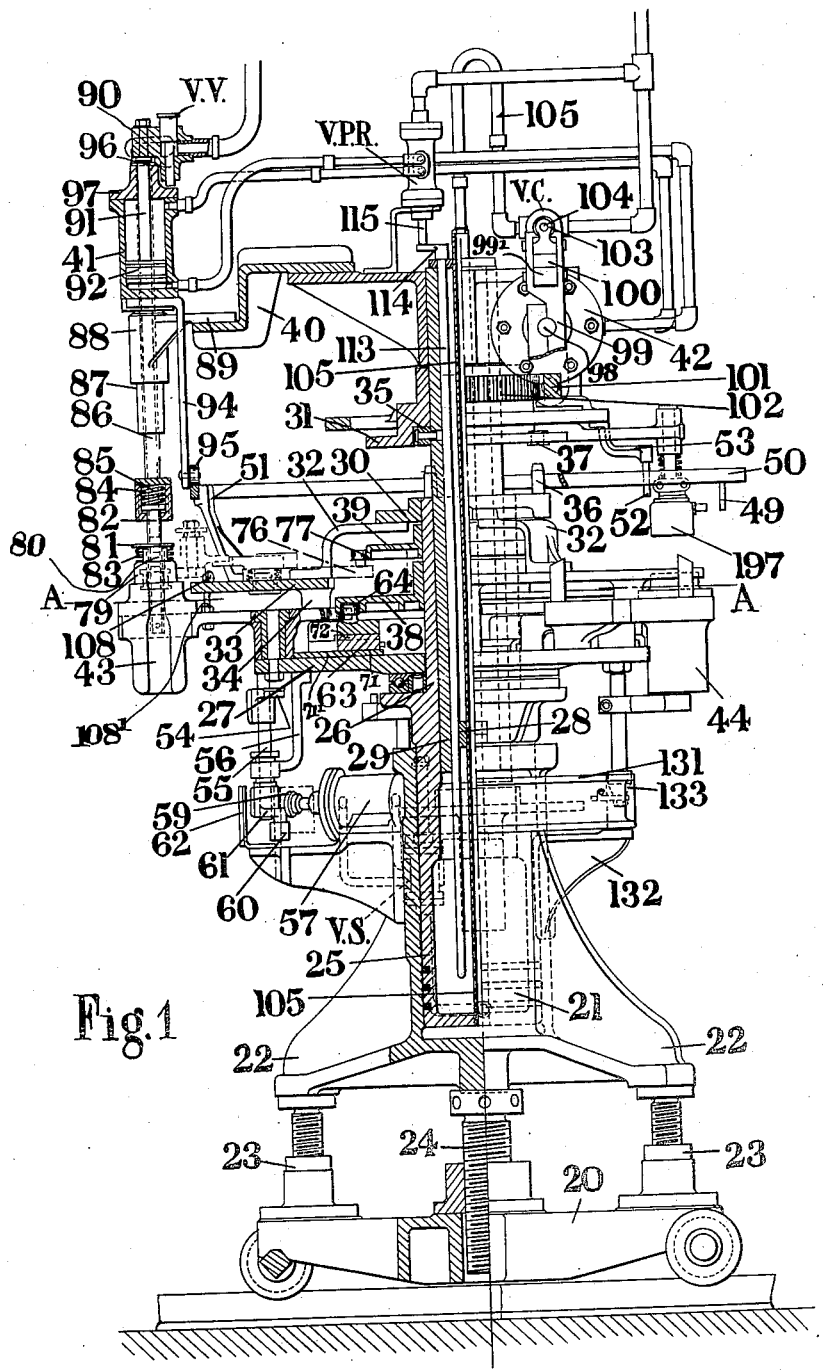
Figure 1 shows in elevation, partly in section, a bottle-forming machine according to the invention.

It will be noted by referring to Figure 3 that each transfer table 33 is provided with curved portions 106 and 107 which are struck from the pivotal centres of the parison mould-holders and the transfer arm respectively. These curved parts of the table form tracks for supporting rollers 108 carried by brackets 108' from the parts mentioned. Figure 1 shows a supporting roller 108 on one of the mould-holders.

Referring back to the transfer arms 48, see Figures 2 and 12, the pinion 75 gearing with the rack 76 is loose upon the pivot spindle 109 of the arm and is provided with an upwardly projecting pin 110 which extends between spring-pressed tongues 111 carried in the boxes 112 Figure 2, rigidly mounted upon the arm 48 or by a single spring 200'. By these means a resilient drive from the cam 39 to the arm is provided whereby when the ring mould is correctly positioned and locked between the parts of the parison mould, any jamming that may be caused by slight imperfections of the cam or for any other reason will be avoided. An adjustable stop 201 may be provided to limit the movement of the arm when it is returned to the parison mould.

The valve V.S. controls the operation of the shear or wiper 54. The valve V.P.R. controls the parison plunger cylinder 41 and the rotation cylinder 42 adapted to cause the rotation of the clutch (and consequently the table) while the valve V.C. controls air to the under side of the column piston 25, in the central cylinder of the machine. The valve V.P.R. controlling the rotation cylinder and the plunger cylinder is actuated by the movements of the column piston, for example by means of a rod 113 extending from the piston through the hollow column and having a tappet 114 engaging the rod 115 of the valve.

As before mentioned, the travel of the piston in the rotation cylinder actuates the valve for controlling the passage of air to the central cylinder, the piston of which is adapted to elevate or depress the table and its associated mechanism.

In operation, assuming that the valve V.C. controlling the movements of the column piston 25 is open to admit air to the under side of said piston, the piston rises and towards its extreme upward movement engages the clutch members 30 and 31, at which time by means of the rod 113 the valve V.P.R. controlling the rotation cylinder 42 admits air to that cylinder and causes the piston to reciprocate the rack 101 which rotates the clutch member 31. During this stroke of the rotation cylinder piston the appropriate parison mould is rotated into the dipping position I, see Figures 2, 3 and 12, and when over the well or stream of glass the parison mould is dipped. The timing of the piston column valve V.C. is arranged so that the air is exhausted from the under side of the column piston 25 to allow the latter to sink for the dipping operation simultaneously with the table ceasing to revolve. This motion causes the table 27 to be lowered and the end of the parison mould to dip into the glass.

In this position the mechanism causes a dwell to take place during which time the parison mould is acquiring a charge of glass. In order to effect a gather the valve V.P.R. controlling the glass plunger piston admits air to its cylinder 41 and causes the piston to move downwardly. During this movement the vacuum tubes 86 are brought down into contact with the parison mould tubes 93 and as they reach their lowest position the vacuum valve V.V. is opened by contacting with cylinder cover 97 so that vacuum is applied and the glass is drawn into the parison mould to fill its cavities. During the downward movement of the piston crosshead 84 the plunger 80 is depressed to form a depression in the glass sucked into the parison mould.

After a suitable period has been allowed for the parison to acquire its gather of glass the table 27 is elevated. When the parison has risen the valve V.S. controlling the shears device actuates the piston of the cylinder 57 to cause the shear arm 54 to travel across the base of the parison mould and sever the stream of glass. The shear arm is reset during subsequent rotation by contact with the fixed cam 58. After the parison has been wiped the piston of the rotation cylinder 42 again makes an operative stroke causing the parison mould to move from its position over the glass.

During the movement of the parison from position I to position II, the roller 64 lies in the circular track 120 of the parison cam groove and the mould is held in the closed condition. On leaving positon II on the next rotation of the table the roller 64 rises on to the outer circular part 121 whereby the parison mould is opened, the parison now being supported by the ring mould carried by the transfer arm. On the parison mould being opened the roller 77 on the rack arm 76 will engage the portion 122 of the transfer cam whereby the transfer arm will be rotated to transfer the parison to the appropriate finishing or blow mould. The finishing mould parts during the transfer are held open by the engagement of the cam pin with the circular portion 123 of the inner track 66. When the transfer is complete said pin will engage the part 124 of the cam whereby the finished mould will be closed at the time it arrives at the blow position IV.

The blow head is held in position with the blow mould during the movement of the latter from position IV to position V and blowing may be effected over a part or the whole of this movement. The blow mould continues its movement in a closed condition from position V until its cam pin engages the part 124 of the track and finally arrives at position VI in which it is fully open and the bottle removed.

The parison mould is retained open from position II$^a$ until it gets to position V when it begins to close, the ring mould having meanwhile been positioned by the part 125 of the transfer cam and the parison mould finally arrives at position I fully closed and ready for another gather.

While each parison is being transferred to a finishing mould, the next following parison mould is brought into position over the glass to go through the operations above described for receiving a gather. The sequence of operations is repeated with each parison in turn while the finishing moulds perform their appointed functions.

The mould cam 38 may be formed in two parts bolted together while the transfer cam 39 may comprise a single unit. The relative positions of the cam plates may be fixed by a set screw 130 carried by the cam 39 by means of the boss 202 and screwing into the boss 203 on the cam 38.

A locking ring 131 may be provided mounted upon a bracket 132 and having a distance piece 133.

I claim:

1. A machine for making bottles or other articles of glass of the character described, comprising a support, a table mounted for rotatable and vertical sliding movement on the support, a plurality of parison and blow moulds mounted on the table, means for effecting a gathering of glass in the desired parison mould, cooperative clutch members mounted respectively on the table and on the upper part of the support, and valve controlled pressure operable means for raising the table on the support to effect engagement of the clutch members so that the table may be partially rotated when elevated.

2. A machine for making bottles or other articles of glass as claimed in claim 1, wherein the support and pressure operable means includes a stand, a cylinder thereon, a piston in the cylinder, and inner and outer column parts the outer of which is carried with the piston and supports the table while the inner column part is fixed relatively to the cylinder and acts to support the upper clutch member.

3. A machine for making bottles or other articles of glass of the character described, comprising a stand, a cylinder thereon, a piston mounted in the cylinder, a column including two parts one of which is carried with the piston while the other is fixed to the cylinder, a table rotatably mounted on the column on the piston, a series of alternately disposed parison and blow moulds positioned in circular series on the table, a clutch including members respectively mounted on the inner fixed column and the table, means for effecting a gathering of glass in the desired parison mould when the table is stationary and the piston is in its lowermost position, and valve controlled pressure operable means for actuating the piston to raise the table and effect engagement of the clutch members whereby the table may be partially rotated when elevated.

4. A machine for making bottles or other articles of glass as claimed in claim 3, wherein cam operable means are provided on the main table for opening and closing all of said moulds, transfer tables supported on the main table, and cam operable means mounted on the transfer tables for transferring the article from one of the parison moulds to the adjacent blow mould in timed relation with the operation of said moulds.

5. A machine for making bottles or other articles of glass as claimed in claim 3, wherein pairs of jaws are pivotally mounted on the main table for carrying the parison and blow moulds and are each provided with slotted rear wings, sliders on said table operably connected with said slotted wings, rollers carried by said sliders, a stationary cam carried on the column part on the piston and coacting with the rollers for effecting opening and closing of the moulds, substantially as and for the purposes set forth.

6. A machine for making bottles or other articles of glass as claimed in claim 3, wherein cam operable sliders are mounted on the main table and operably connected to the moulds for operating the moulds, each of said sliders being formed of two parts and springs arranged between the parts of the sliders whereby resilient action is obtained.

7. A machine for making bottles or other articles of glass as claimed in claim 3, wherein transfer tables are mounted on the main table between each parison mould and the next following blow mould, a transfer arm mounted on each of said transfer tables and adapted to work between the adjacent moulds, cam operable means for operating said transfer arms, neck ring moulds at the outer end of each arm, a ring member carried by the transfer table, and means carried by the parison and blow moulds and coacting with the ring member for opening and closing the neck ring moulds on the transfer arms.

8. A machine for making bottles or other articles of glass as claimed in claim 3, wherein transfer tables are mounted on the mould carrying table and wherein cam operable sliders are provided for opening and closing the moulds, racks operably connected with the cam operable sliders, a transfer arm pivoted on each of the transfer tables, a pinion loosely mounted on the pivoted axis of each arm, a pin arranged on each pinion, and spring tongues on the transfer arm engageable by the pin whereby resilient action is obtained.

9. A machine for making bottles or other articles of glass as claimed in claim 3, wherein a rotatable shear arm is arranged beneath the main mould carrying table, means depending form the table for guiding the shear arm, pressure operable means for operating the shear arm, means for limiting the outward movement of the shear arm, and cam means coacting with the shear arm for returning the arm to its initial position.

10. A machine for making bottles or other articles of glass as claimed in claim 3, wherein a valve controlled pressure operable and slidably mounted rack bar is employed, and a gear carried with the clutch member on the column part on the cylinder and engageable by the rack bar for effecting rotation of the table when the clutch members are engaged with each other.

11. A machine for making bottles or other articles of glass as claimed in claim 3, wherein a blow head is mounted on the clutch member on the column part on the cylinder and is adapted for association with the desired blow mould when the table is in an elevated position, substantially as and for the purposes set forth.

12. A machine for making bottles or other articles of glass as claimed in claim 3, wherein pressure operable means is supported on the top of the fixed column and includes a glass plunger cylinder, a plunger therein for forming the preliminary depression in the neck of the bottle, tubes operably connected with the plunger and adapted to be connected with the desired parison mould, and a valve for controlling the vacuum supply actuated by the relative movements of the plunger and its cylinder.

In testimony whereof I have signed my name to this specification.

ALEXANDER McNISH.